United States Patent [19]

Kohjiya et al.

[11] Patent Number: 4,656,245

[45] Date of Patent: Apr. 7, 1987

[54] FUNCTIONAL ELASTOMER

[75] Inventors: Shinzo Kohjiya; Shinzo Yamashita, both of Kyoto; Masahiro Irie, Osaka; Yoshitaka Osawa, Osaka; Takafumi Uemiya, Osaka, all of Japan

[73] Assignee: Sumitomo Electric Industries, Ltd., Osaka, Japan

[21] Appl. No.: 836,863

[22] Filed: Mar. 7, 1986

[30] Foreign Application Priority Data

Mar. 8, 1985 [JP] Japan .................. 60-46847

[51] Int. Cl.$^4$ ............................ C08G 65/26
[52] U.S. Cl. .................... 528/405; 525/403; 525/409; 358/902
[58] Field of Search .............. 528/405; 525/403, 409

[56] References Cited

U.S. PATENT DOCUMENTS 3,532,646 10/1970 Antikow et al. ............. 528/405 X
3,639,654 2/1972 Robins ..................... 528/405 X
3,917,817 11/1975 Vanlerberghe et al. ....... 528/405 X
4,071,478 1/1978 Shen et al. ................. 528/405 X

*Primary Examiner*—Earl Nielsen
*Attorney, Agent, or Firm*—Sughrue, Mion, Zinn, Macpeak & Seas

[57] ABSTRACT

A functional elastomer in which a viologen unit is introduced into a principal polymeric chain through cationic polymerization by using a bifunctional initiator, said elastomer being represented by the formula

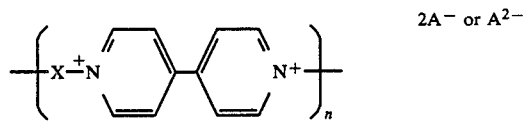

wherein X represents polyether and A represents an anion.

9 Claims, 3 Drawing Figures

FUNCTIONAL ELASTOMER

FIELD OF THE INVENTION

The present invention relates to a functional elastomer.

BACKGROUND OF THE INVENTION

Viologen (N,N-dialkyl-4,4'-dipyridinium) has an oxidation-reduction function so as to produce viologen radical when it is subjected to formation of unpaired electron, the viologen radical being easily oxidized to return to the original compound.

Further, an elastomer comprising a viologen unit is an oxidation-reduction resin, and may be an electronic conductor for oxidation-reduction reaction. Because viologen is reduced by light under a predetermined condition, an elastomer comprising a viologen unit may be used as a light energy conversion film. Because viologen cation radical produced by reducing viologen assumes a blue color or a purple color, an elastomer comprising a viologen unit exhibits photochromism and electrochromism, thus it can be used as a light quantity material, a picture recording blank material, a character display, and so forth.

Synthesis of a polymer comprising a viologen unit, which can be formed into a film form, through polycondensation reaction between diamine comprising a viologen unit and acid chloride of carboxylic acid has been reported (Journal of Polymer Science, Polymer Chemistry Edition, Vol. 13, pp. 1-16, 1975). The film formed with the above-mentioned polymer, however, was too glassy and fragile to be used as the above-mentioned material for practical use.

Further, a polymer comprising a viologen unit synthesized through cationic-polymerization of tetrahydrofuran by using mono-functional Lewis acid as an initiator has been also reported (The Society of Polymer Science of Japan, *Polymer Preprints*, Vol. 31, p. 330, 1982). In the case of this polymer, only one viologen unit is present in one polymer chain, and this polymer had no practical utility from the viewpoint of mechanical strength and was insufficient in exhibiting the above-mentioned functional property which is peculiar to viologen. Further, the above-mentioned report teaches another polymer comprising a viologen unit which is synthesized such that both the terminal hydroxy groups of the polyether having hydroxy groups at the terminals thereof are tosylated and then subjected to reaction with 4,4'-dipyridyl. This polymer, however, is only a dimer or trimer, and it cannot be formed into film or the like.

As described above, various syntheses of polymers comprising a viologen unit have been attempted, but it is clear from the foregoing that no polymer which can be utilized as an elastomer has yet been developed.

SUMMARY OF THE INVENTION

In view of the above-mentioned background, an object of the present invention is to provide an elastomer in which a viologen unit is introduced into a principal polymeric chain, which can be formed into film, which has a sufficient mechanical strength to endure practical use, and which is capable of exhibiting the above-mentioned functional property peculiar to viologen.

In order to achieve the object, according to an aspect of the present invention, a functional elastomer in which a viologen unit is introduced into a principal polymeric chain through cationic polymerization by using a bifunctional initiator, said elastomer being represented by the formula

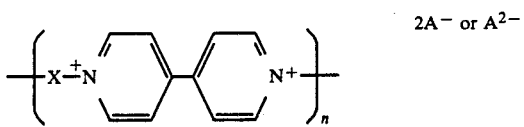

wherein X represents polyether and A represents an anion.

BRIEF DESCRIPTION OF THE DRAWINGS

The drawings show embodiments according to the present invention in which.

DETAILED DESCRIPTION OF THE INVENTION

Figure 1:
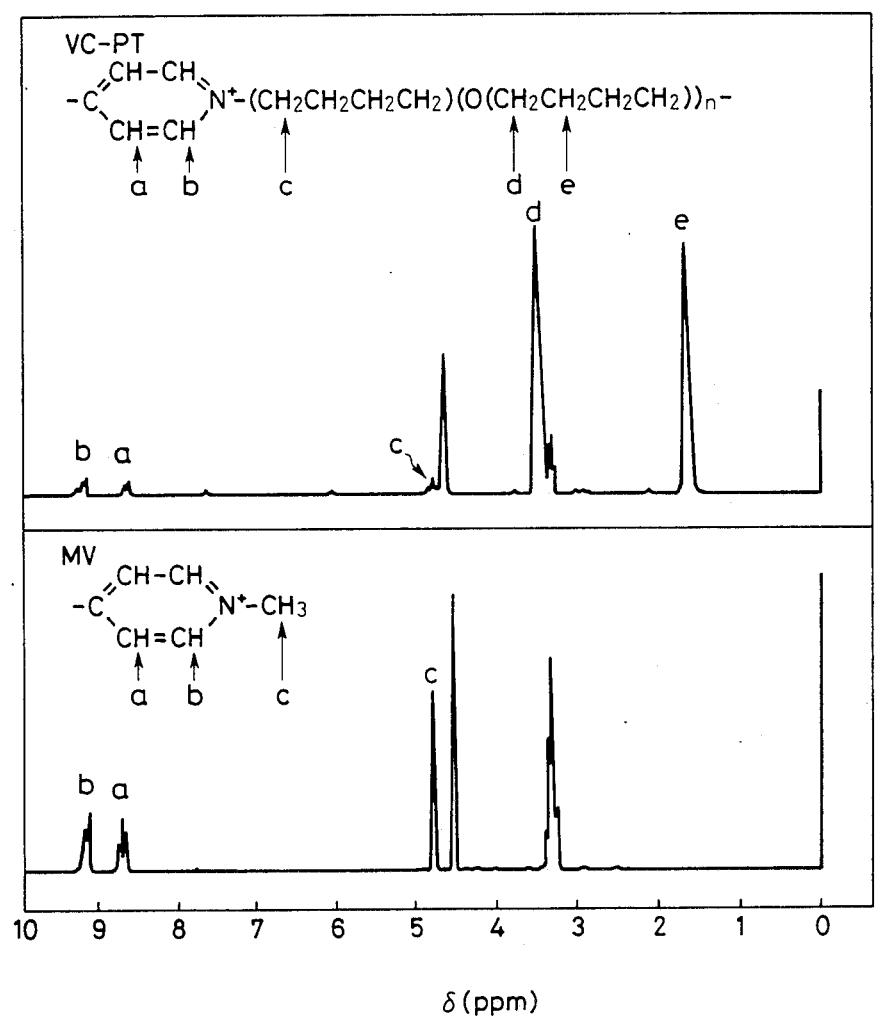
FIG. 1 is a diagram of an $^1$H-NMR spectrum.

Acid anhydrides such as anhydride of trifluoromethanesulfonic acid, anhydride of chlorosulfonic acid, etc; and dicarbonium salts such as styrene dimer dication salt, etc. are preferably used as bifunctional initiators.

The polyether may be obtained by cationic polymerization of cyclic ethers such as tetrahydrofuran, methyltetrahydrofuran, ethylene oxide, propylene oxide, epichlorohydrin, 3,3'-bischloromethyloxetane, or the like, and derivatives thereof, or the like, by using the bifunctional initiator as described above.

Further, examples of useful anions are shown in the listing below.

Halogen ions
$F^-$, $Cl^-$, $Br^-$, $I^{31}$

Carboxylic acid ions

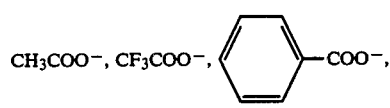

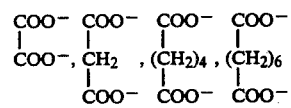

Sulfuric acid ions
$HSO_4^-$, $CH_3SO_4^-$

Sulfonic acid ions
$CH_3SO_3^-$, $C_2H_5SO_3^-$, $CH_3(CH_2)_6SO_3^-$,

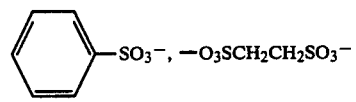

By adding 4,4'-dipyridyl as a stopping agent to the above reaction system, a polymer in which a viologen unit is introduced into a principal polymeric chain can be obtained.

The above and other objects and features of the invention will appear more fully hereinafter from a consideration of the following detailed description taken in connection with the accompanying drawings.

The embodiments according to the present invention will be described hereunder but do not limit the present invention.

EXAMPLE 200 g of dehydrated and purified tetrahydrofuran (THF) was put into a 500 ml eggplant flask and was subjected to nitrogen substitution. While vigorously stirring THF in a thermoregulator tank of 2° C., 7.7 g of trifluoromethane-sulfonic acid anhydride was added to THF so as to perform polymerization for fifteen minutes.

The polymerization reaction solution was added to about 200 ml of THF solution of 4,4'-dipyridyl (bpy) (18.7 g/200 ml THF) cooled to about $-70°$ C. so that reaction was performed for an hour. Next, while stirring, the reacted solution was poured gradually into about 800 ml of 0.5N-NaBr aqueous solution at room temperature so as to precipitate the desired polymer.

After the recovered polymer (VC-PT) was washed with pure water, then reprecipitated in methanol and a 0.5N-NaBr aqueous solution, it was again reprecipitated in methanol and pure water in order to obtain it in a purified form.

As a polymer to be used as an object to be compared in viscosity with the polymer VC-PT according to the present invention in which a viologen unit is introduced in a principal chain, a polymer (PT-PT) was obtained similarly to the above operation, excepting that pyridine, which is a mono-functional amine, was added into the solution of the same batch of the above-mentioned polymerization solution of THF and trifluoromethane sulfonic acid anhydride instead of bpy.

Viscosity Measurement:

The following Table I shows the respective limiting viscosity numbers obtained by the measurement of the respective viscosities of VC-PT and PT-PT in 0.1N-LiBr methanol solution, and the polystyrene reduced molecular weight obtained from the peak position of gel permeation chromatography (GPC) curve of PT-PT.

TABLE I

|       | Limiting Viscosity Number (dl/g) | Molecular Weight |
|-------|----------------------------------|------------------|
| VC-PT | 0.78                             | —                |
| PT-PT | 0.14                             | 3400             |

As is apparent from Table I, the limiting viscosity number of VC-PT is above five times that of PT-PT, and that the molecular weight extremely increases due to the extension of chain by the polytetrahydrofuran living dication and bpy.

According to the documents (K. Kataoka et al; *Macromol. Chem.*, Vol. 108, p. 65, 1979), the molecular weight measuring technique for ionic polymers has not yet been established. Accordingly, as shown in Table I, the respective viscosities of VC-PT and PT-PT have been measured and compared.

The gel permeation chromatography (GPC) curves were obtained by using HLC802 liquid chromatography with GMH-4 column (manufactured by Toyo Soda Co., Ltd.).

Elemental Analysis:

The following Table II shows the result of elemental analysis of the VC-PT and PT-PT. The calculated values in Table II are obtained on the assumption that the degree of polymerization of THF is 40.

TABLE II

|        | VC-PT         |                  | PT-PT         |                  |
|--------|---------------|------------------|---------------|------------------|
|        | Measured Value | Calculated Value | Measured Value | Calculated Value |
| C (%)  | 63.75         | 64.12            | 63.42         | 64.08            |
| H (%)  | 10.56         | 10.38            | 10.69         | 10.44            |
| O (%)  | 20.92         | 19.60            | 20.90         | 19.58            |
| N (%)  | 0.87          | 0.88             | 0.62          | 0.80             |
| Br (%) | 4.79          | 5.02             | 4.98          | 5.02             |

The measured values obtained substantially agree with the calculated values when the degree of polymerization of THF is assumed to be 40. Thus, the molecular weight of PT-PT is 3,186 which value substantially agrees with the molecular weight obtained by GPC. Further, the molecular weight of PT-PT is considered to be that of a polyoxytetramethylene segment of VC-PT, and it will be found that VC-PT is an ionic polymer comprising the polyoxytetramethylene segment of about 3,000 molecular weight in the principal polymeric chain thereof.

Spectrum Analysis:

FIG. 1 shows $^1$H-NMR spectrum of VC-PT and comparative $^1$H-NMR spectrum of methyl viologen (MV). As is apparent from the spectrum of the VC-PT, recognized are the peak of $\beta$-methylene of polyoxytetramethylene (1.6 ppm), the peak of $\alpha$-methylene of polyoxytetramethylene (3.4 ppm), the peak of $N^+\text{-}CH_2$ (4.8 ppm), the peak of a proton at $\beta$-position of pyridine ring (8.6 ppm), and the peak of a proton at $\alpha$-position of pyridine ring (9.1 ppm). These peaks correspond closely to the respective peaks of $N\text{-}CH_3$, of a proton at $\beta$-position of pyridine ring, and of a proton at $\alpha$-position of pyridine ring, in MV, and therefore it is recognized that the viologen structure exists in VC-PT. It is considered that the peaks at 3.35 ppm and in the vicinity of 4.6 ppm are caused by a residual proton in methanol deuteride and by water comprised in the solvent, respectively.

Figure 2:
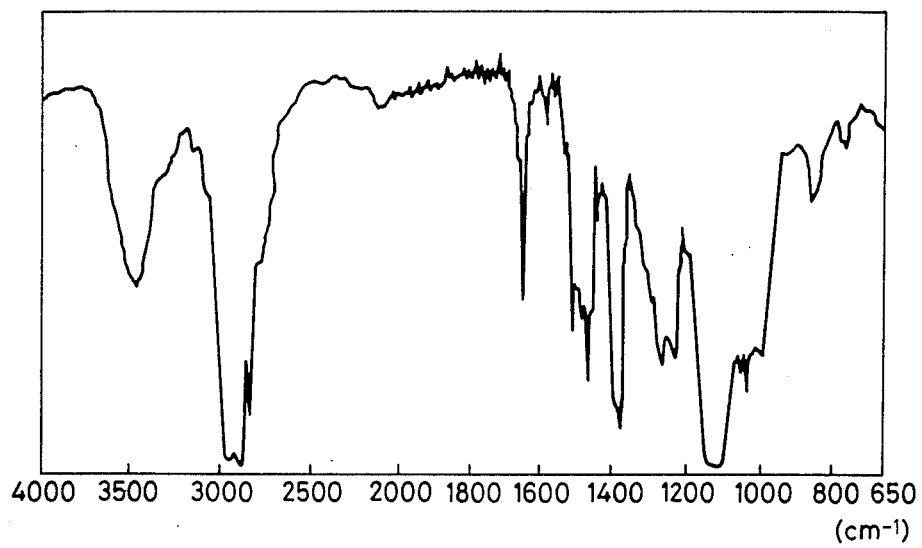
FIG. 2 is a diagram of an IR spectrum.
Figure 3:
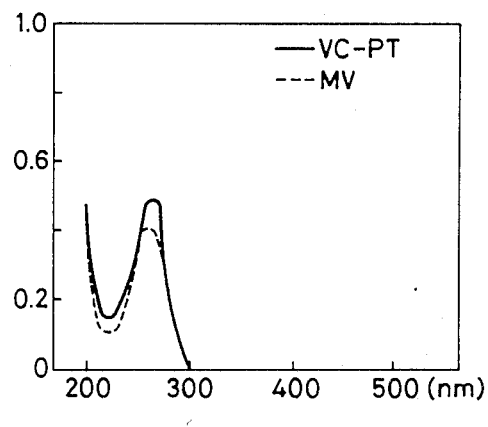
FIG. 3 is a diagram of a UV spectrum.

Next, FIG. 2 shows the IR spectra of the VC-PT thin film and FIG. 3 shows UV spectra of VC-PT and MV in the methanol. In FIG. 3, an absorption peak of VC-PT due to the viologen group appeared at 260 nm and agreed with the peak of MV. With MV as a reference material, the molar absorption coefficient of the viologen group in the methanol solution was obtained, and then the concentration of the viologen group in VC-PT of $1.6 \times 10^4$ mol/g was obtained on the basis of the molar absorption coefficient.

The nuclear magnetic resonance spectra ($^1$H-NMR), the ultraviolet and visible rays absorption spectra, and the infrared rays absorption spectra were measured by using the Varian FX-200 Fourier transform magnetic resonance spectrum device, DB-G Granting Spectrometer of Beckman Toshiba Ltd., and 215 type Grating Infrared Spectrometer of Hitachi, Ltd., respectively.

Formation of Film:

The VC-PT obtained was cast on a mold made of Teflon from the methanol solution of the VC-PT, and the solvent was evaporated at room temperature to thereby form the film.

Properties of the VC-PT Film:

Tensile testing of the VC-PT obtained film was performed according to JIS K6301. As the results of the testing, Table III shows the modulus of elasticity under a 100% stretched condition (M100), tensile strength (TB), breaking elongation (EB), and residual distortion three minutes after breaking (Set).

The VC-PT film which was dried at 40° C. under reduced pressure after formation of film was used, and an annular test piece having 0.5 mm thickness and 4 cm circumference was subject to the test at a speed of 10 mm/minute and at a room temperature of 29.5° C.

TABLE III

| M 100 (Mpa) | TB (%) | EB (%) | Set (%) |
|---|---|---|---|
| 1.89 | 32.0 | 620 | 13 |

As is apparent from Table III, it is found that the film shows such high hardness that the tensile strength (TB) exceeds 30 Mpa, the breaking elongation (EB) is as large as 600% or more, and the film is a very strong elastomer having a good tensile properties.

Observation of Photochromism:

Table IV shows the result of observation of photochromism of the obtained VC-PT and the VC-PT added with 1.1 wt% of polyvinylpyrrolidone.

In the experiment, samples were put into flasks, sufficiently deaired by using a vacuum line, and then subjected to light radiation to observe the changes in color. A 150-watt halogen lamp (slide projector TWIN CABIN made by Cabin Industrial Co.) was used as a light source.

TABLE IV

| | Change of color due to light irradiation | Time required for change of color |
|---|---|---|
| VC-PT | Light yellow → Deep Green | 5–6 (Hours) |
| VC-PT + PVP | Light yellow → Deep Green | 5–10 (Seconds) |

As is apparent from Table IV, the film changed from light yellow to deep green due to the light irradiation. When the film was left in air, the color of the film was again changed back to the original light yellow. Further, it was proved that the time required for the color change was shortened from several hours to several seconds when PVP was added as a light sensitizer. Further, in the methanol solution of the VC-PT, a change in color occurred from yellowish green to deep green, due to the light irradiation when tetrasodium ethylenediaminetetraacetate tetrahydride salt and proflavine were used as the sensitizer. When N-methyl-2-pyrrolidone was used a solvent, the color of the solution became deep green due to the light irradiation, without using any sensitizer. The thus-changed color of the solution returned back to the original color immediately after air was introduced into the solution.

Thus, it has been proved that the VC-PT is a photochromic polymer which causes in color change due to light irradiation in both causes, i.e., VC-PT is in the form of solution or film.

Besides due to the reduction by light, the VC-PT film can be subjected to formation of an unpaired electron by a reducing agent such as, for example, sodium hydrosulfite, so as to change in color. Thus, when the VC-PT film was soaked in the sodium hydrosulfite solution, the film showed a bright purple color.

The embodiments of the invention have been described in detail above. In those embodiments, however, the conditions of polymerization, for example, the molecular weight of the polymer can be changed depending on the concentration of bpy, and the molecular weight of polyether can be changed depending on the polymerizing time of THF, to optimize a particular embodiment of the invention.

The polyether is not limited to THF; it is also possible to use cyclic ether and derivatives thereof which can be cationically polymerized by using a bifunctional initiator.

The present invention has such construction as described above and therefore the material of the present invention has sufficient characteristics as an elastomer in that the material can be easily formed into film, is superior in workability, has very high hardness, and has a wide region of application such as, for example, use as optical memory elements utilizing a coloring function due to the reduction by light, or the like.

While the invention has been described in detail and with reference to specific embodiments thereof, it will be apparent to one skilled in the art that various changes and modifications can be made therein without departing from the spirit and scope thereof.

What is claimed is:

1. A functional elastomer in which a viologen unit is introduced into a principal polymeric chain through cationic polymerization by using a bifunctional initiator, said elastomer being represented by the formula

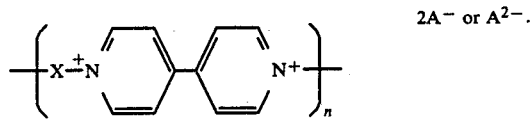

wherein X represents polyether and A represents an anion.

2. The functional elastomer as claimed in claim 1, wherein said bifunctional initiator is an acid anhydride.

3. The functional elastomer as claimed in claim 2, wherein said bifunctional initiator is selected from the group consisting of trifluoromethanesulfonic acid anhydride and chlorosulfonic acid anhydride.

4. The functional elastomer as claimed in claim 1, wherein said bifunctional initiator is a dicarbonium salt.

5. The functional elastomer as claimed in claim 4, wherein said bifunctional initiator is styrene dimer dication salt.

6. The functional elastomer as claimed in claim 1, wherein said polyether represented by X is obtained by cationic polymerization of a cyclic ether or a derivative thereof.

7. The functional elastomer as claimed in claim 6, wherein said cyclic ether is selected from the group consisting of tetrahydrofuran, methyltetrahydrofuran, ethylene oxide, propylene oxide, epichlorohydrin and 3,3'-bischloromethyloxetane.

8. The functional elastomer as claimed in claim 1, wherein said anion represented by A is selected from the group consisting of a halogen ion, a carboxylic ion, a sulfuric ion and sulfonic ion.

9. The functional elastomer as claimed in claim 1, wherein the stopping agent which is used in said cationic polymerization is 4,4'-dipyridyl.

* * * * *